United States Patent
Yun et al.

(10) Patent No.: US 12,230,776 B2
(45) Date of Patent: Feb. 18, 2025

(54) BATTERY PACK AND DEVICE INCLUDING THE SAME

(71) Applicant: LG Energy Solution, Ltd., Seoul (KR)

(72) Inventors: Hyun Seop Yun, Daejeon (KR); Won Kyoung Park, Daejeon (KR); Junyeob Seong, Daejeon (KR); Honggoo Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 484 days.

(21) Appl. No.: 17/771,236

(22) PCT Filed: Mar. 9, 2021

(86) PCT No.: PCT/KR2021/002919
§ 371 (c)(1),
(2) Date: Apr. 22, 2022

(87) PCT Pub. No.: WO2021/221297
PCT Pub. Date: Nov. 4, 2021

(65) Prior Publication Data
US 2022/0367940 A1 Nov. 17, 2022

(30) Foreign Application Priority Data
Apr. 29, 2020 (KR) .................. 10-2020-0052261

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/653* (2015.04);
(Continued)

(58) Field of Classification Search
None
See application file for complete search history.

(56) References Cited

U.S. PATENT DOCUMENTS

| | | |
|---|---|---|
| 2005/0134038 A1 | 6/2005 | Walsh |
| 2009/0325055 A1 | 12/2009 | Koetting et al. |
| (Continued) | | |

FOREIGN PATENT DOCUMENTS

| | | |
|---|---|---|
| CN | 102217132 A | 10/2011 |
| CN | 105103358 A | 11/2015 |
| (Continued) | | |

OTHER PUBLICATIONS

Extended European Search Report for Application No. 21796070.7 dated Jan. 24, 2024, pp. 1-5.

(Continued)

*Primary Examiner* — Haroon S. Sheikh
*Assistant Examiner* — Claire A Rutiser
(74) *Attorney, Agent, or Firm* — Lerner David LLP

(57) ABSTRACT

A battery pack according to an embodiment of the present invention may include a plurality of battery modules including a battery cell stack where a plurality of battery cells are stacked, a module frame accommodating the battery cell stack, and a heat sink disposed below a bottom portion of the module frame. A pack frame may accommodates the plurality of battery modules. A refrigerant transmission bolt may couple the bottom portion of the module frame, the heat sink, and the pack frame. The pack frame may includes a pack refrigerant pipe for supply and discharge of a refrigerant. A connection conduit in the refrigerant transmission bolt may connects the pack refrigerant pipe and the heat sink.

15 Claims, 11 Drawing Sheets

(51) Int. Cl.
*H01M 10/653* (2014.01)
*H01M 10/6554* (2014.01)
*H01M 10/6567* (2014.01)
*H01M 50/211* (2021.01)
*H01M 50/264* (2021.01)

(52) U.S. Cl.
CPC .............. *H01M 10/6554* (2015.04); *H01M 10/6567* (2015.04); *H01M 50/211* (2021.01); *H01M 50/264* (2021.01)

(56) References Cited

U.S. PATENT DOCUMENTS

| | | | |
|---|---|---|---|
| 2014/0162099 A1 | 6/2014 | Dibos et al. | |
| 2015/0059581 A1* | 3/2015 | Adams .................. | F16L 41/03 137/561 A |
| 2016/0056492 A1 | 2/2016 | Tsuga et al. | |
| 2017/0352934 A1 | 12/2017 | Kim et al. | |
| 2018/0034117 A1 | 2/2018 | Bang et al. | |
| 2018/0114961 A1 | 4/2018 | Kim et al. | |
| 2018/0151930 A1 | 5/2018 | Kim et al. | |
| 2018/0358593 A1 | 12/2018 | Seo et al. | |
| 2018/0366794 A1 | 12/2018 | Kim et al. | |
| 2019/0173064 A1 | 6/2019 | Lee et al. | |
| 2020/0067155 A1 | 2/2020 | Hwang et al. | |
| 2021/0066769 A1 | 3/2021 | Hong et al. | |

FOREIGN PATENT DOCUMENTS

| | | |
|---|---|---|
| CN | 105161644 A | 12/2015 |
| CN | 205960159 U | 2/2017 |
| CN | 206076447 U | 4/2017 |
| CN | 208157589 U | 11/2018 |
| CN | 209496984 U | 10/2019 |
| EP | 3327821 A1 | 5/2018 |
| JP | 2018527705 A | 9/2018 |
| JP | 2019516225 A | 6/2019 |
| JP | 2019145490 A | 8/2019 |
| JP | 2021512452 A | 5/2021 |
| KR | 20140074830 A | 6/2014 |
| KR | 20150135501 A | 12/2015 |
| KR | 20170001419 A | 1/2017 |
| KR | 20170050509 A | 5/2017 |
| KR | 20180006150 A | 1/2018 |
| KR | 20180061702 A | 6/2018 |
| KR | 20200001705 A | 1/2020 |

OTHER PUBLICATIONS

International Search Report for Application No. PCT/KR2021/002919 mailed Jul. 5, 2021, 2 pages.
Search Report dated Sep. 5, 2023 from the Office Action for Chinese Application No. 202180005875.9 issued Sep. 8, 2023, pp. 1-3. [See pp. 1-2, categorizing the cited references].

* cited by examiner

【Figure 1】
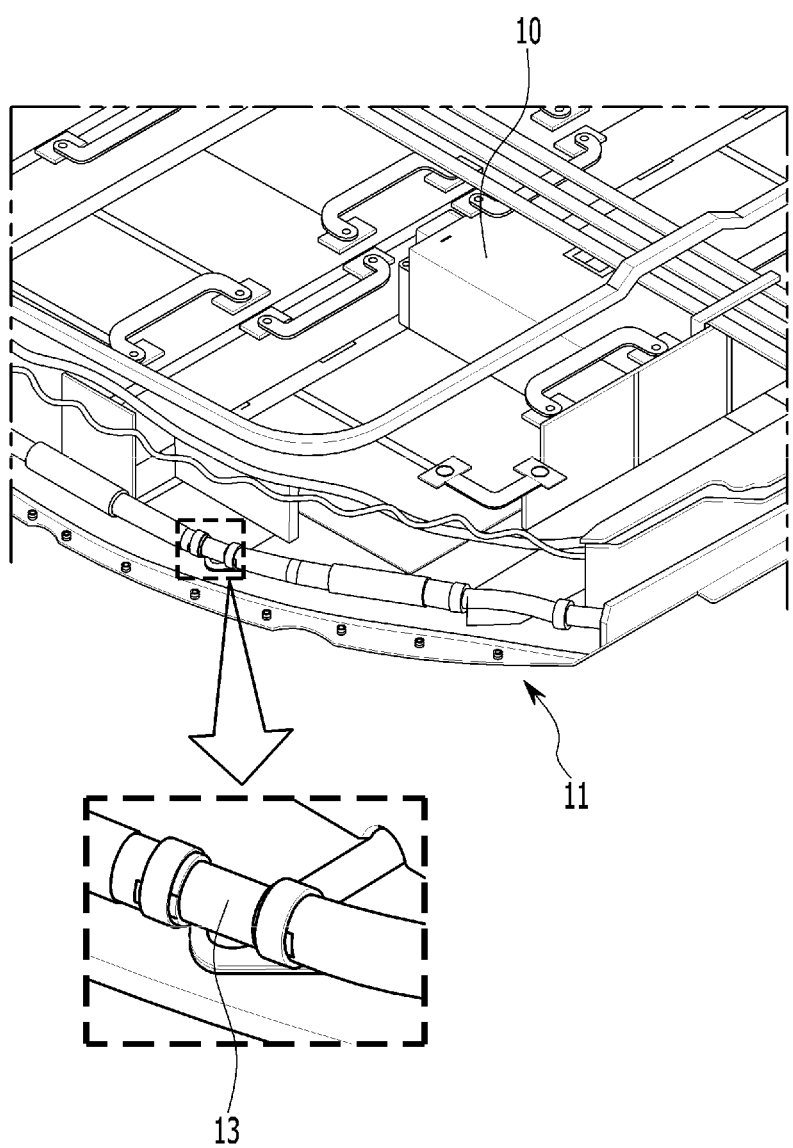

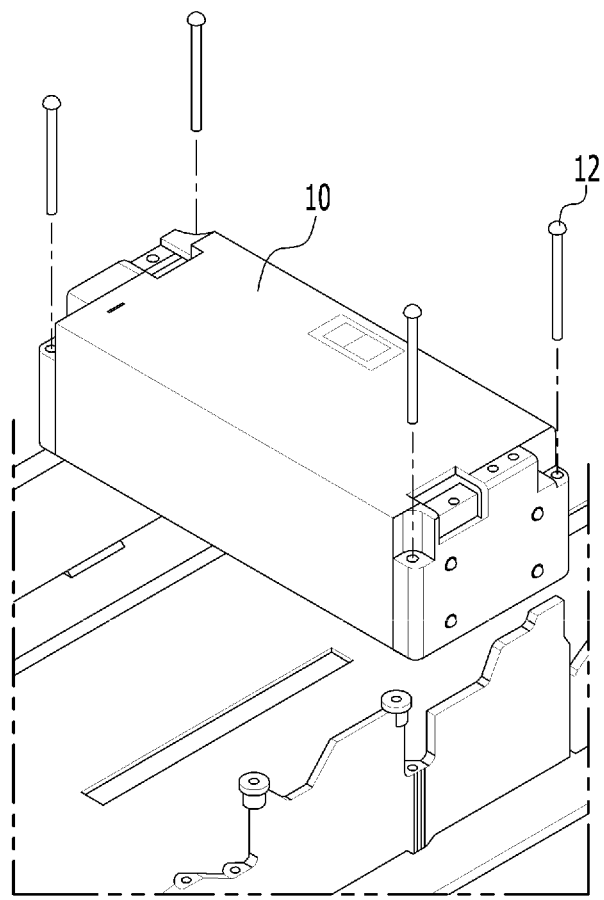
【Figure 2】

【Figure 3】
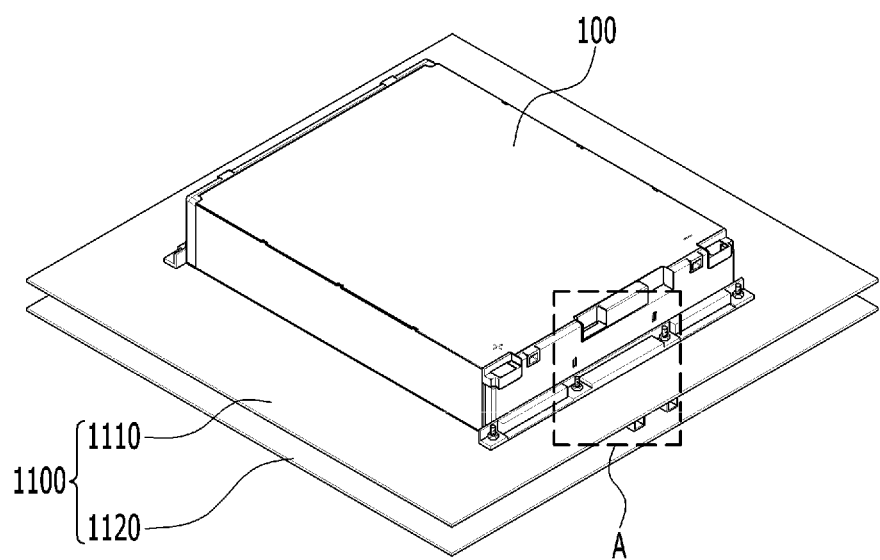

[Figure 4]
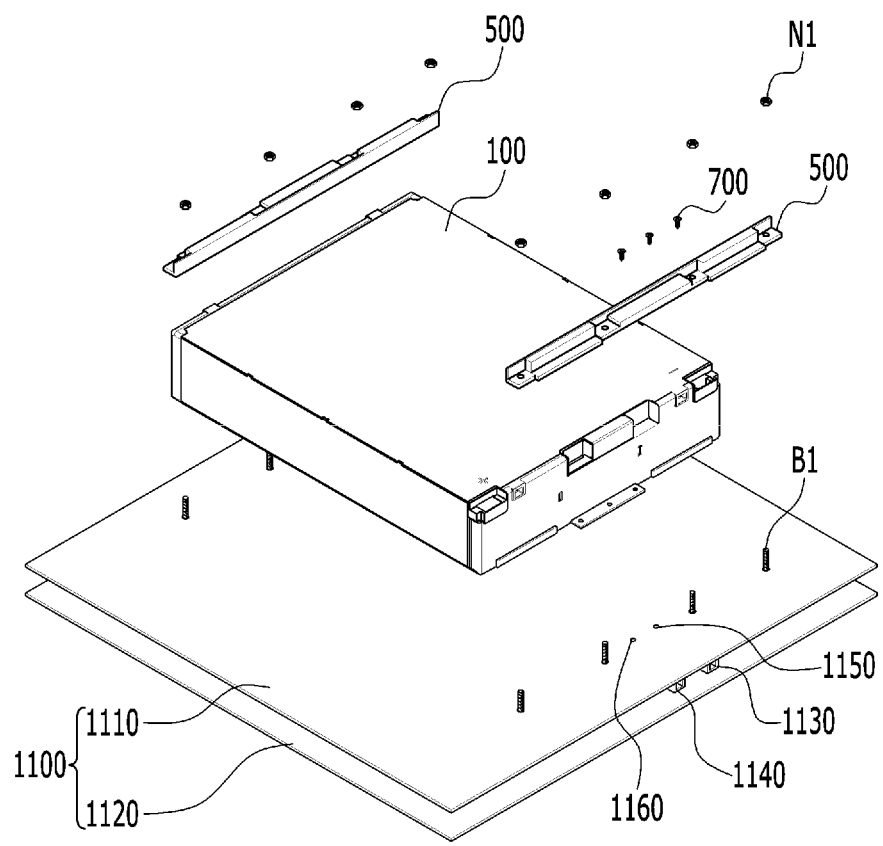

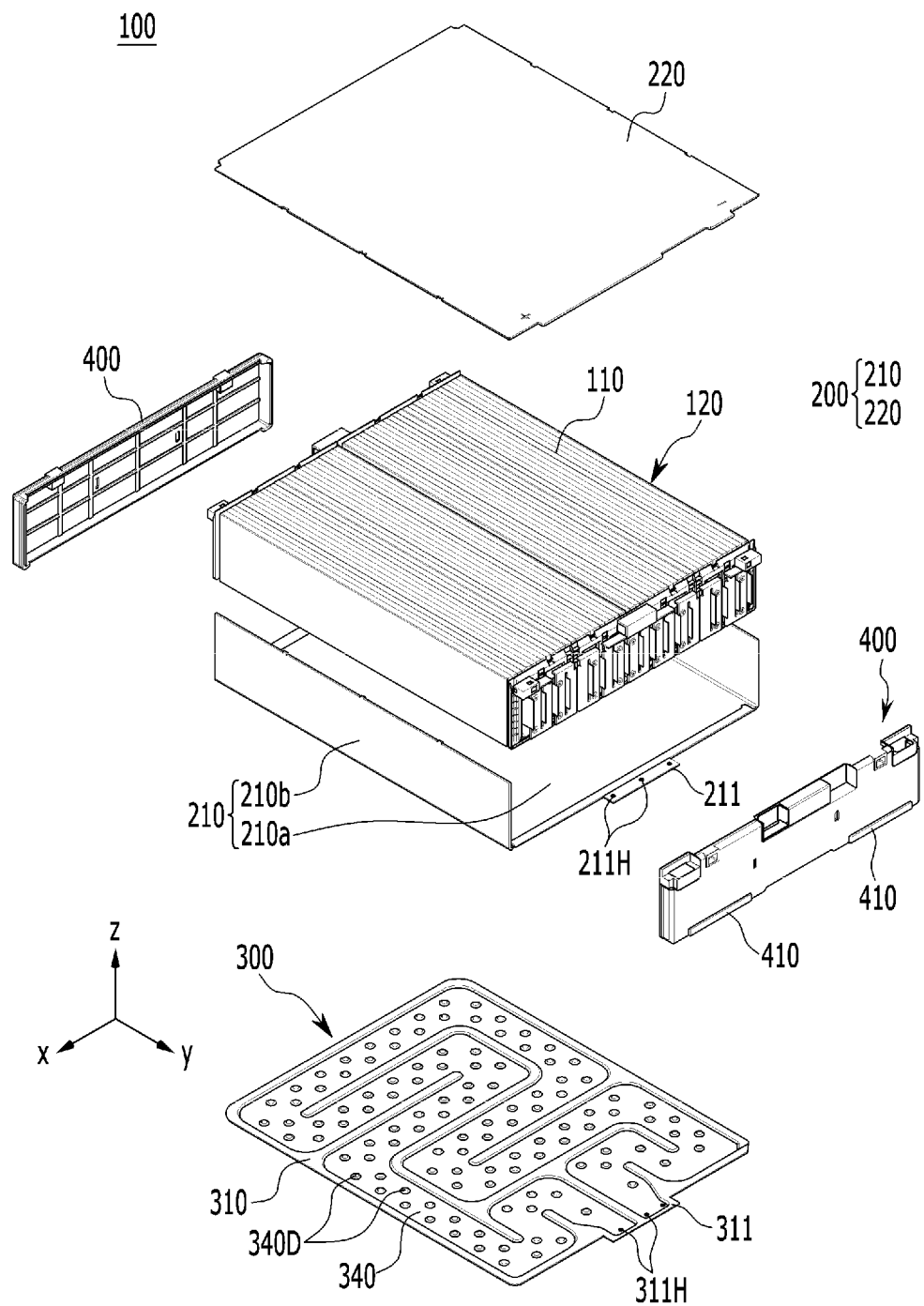
[Figure 5]

[Figure 6]
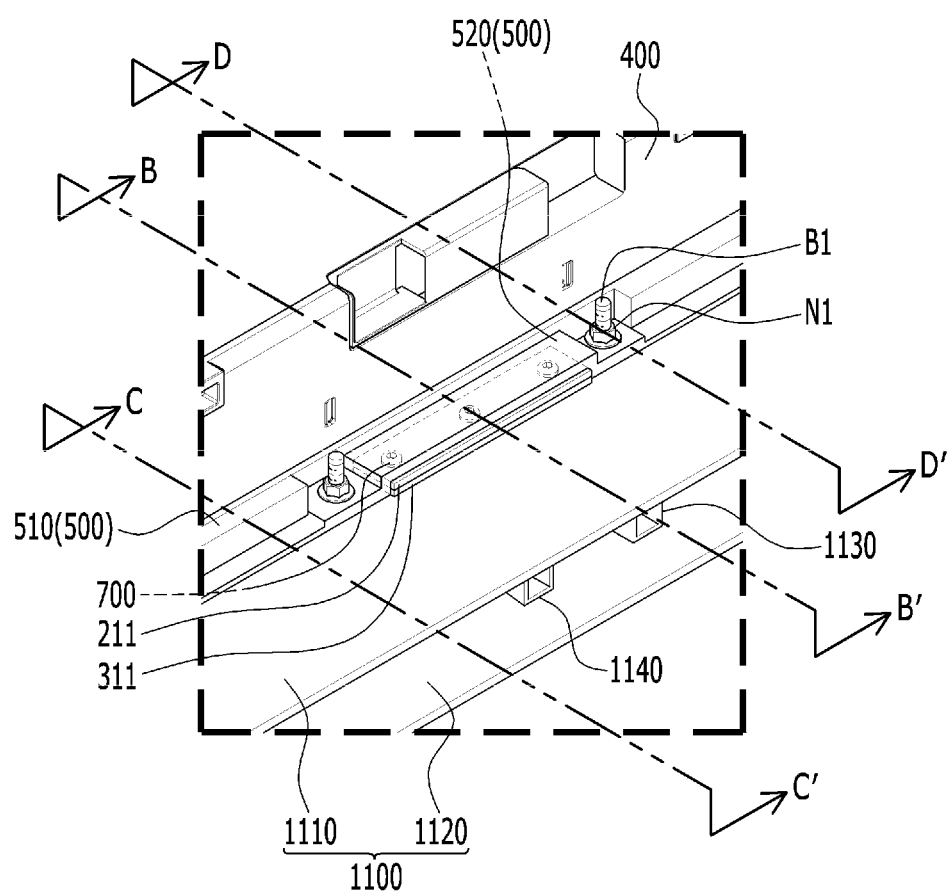

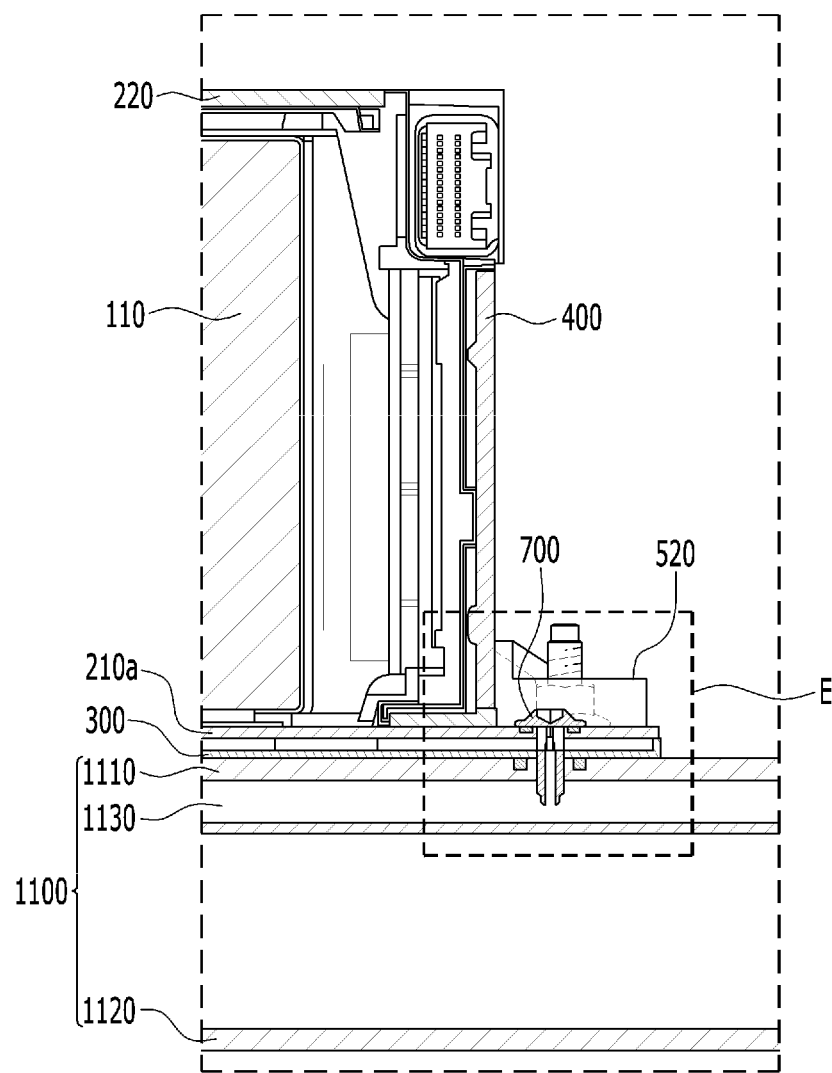
[Figure 7]

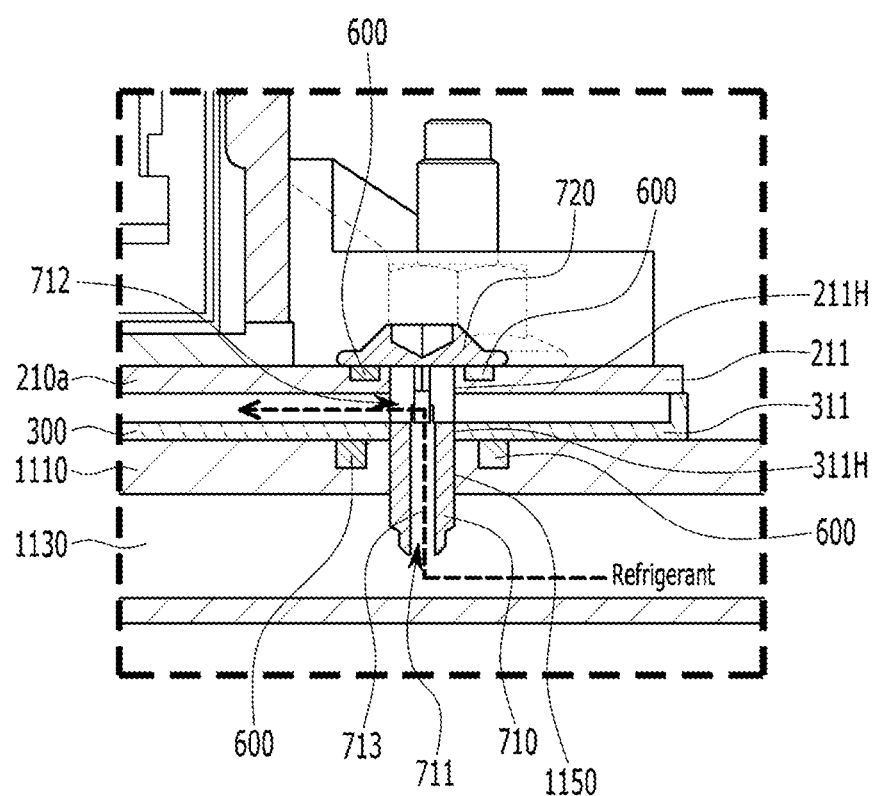
[Figure 8]

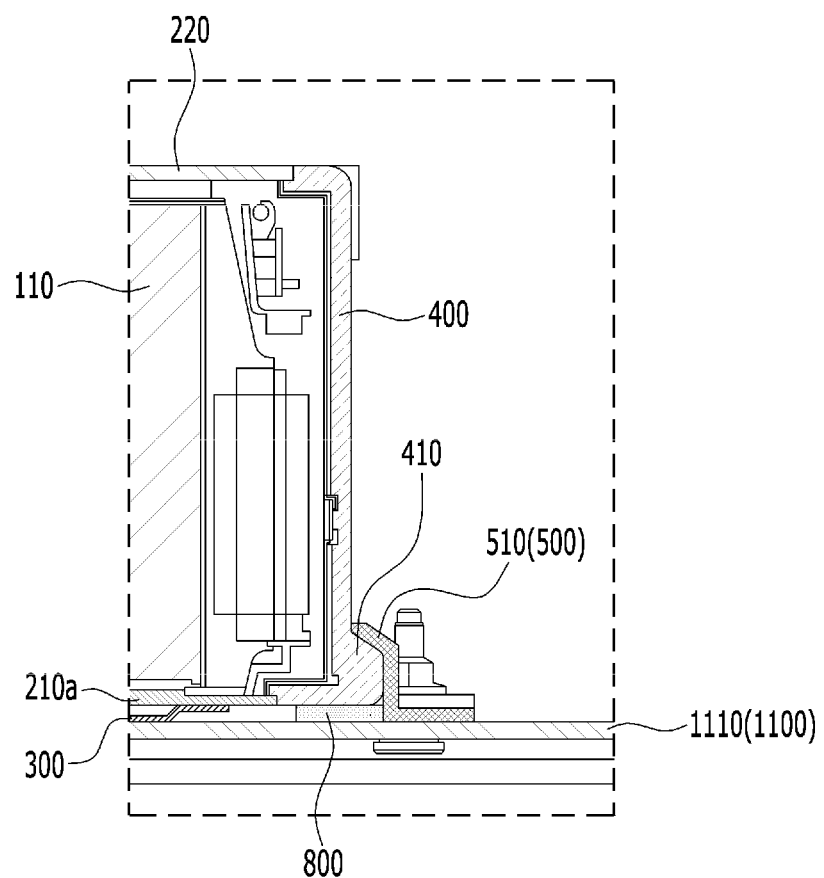
[Figure 10]

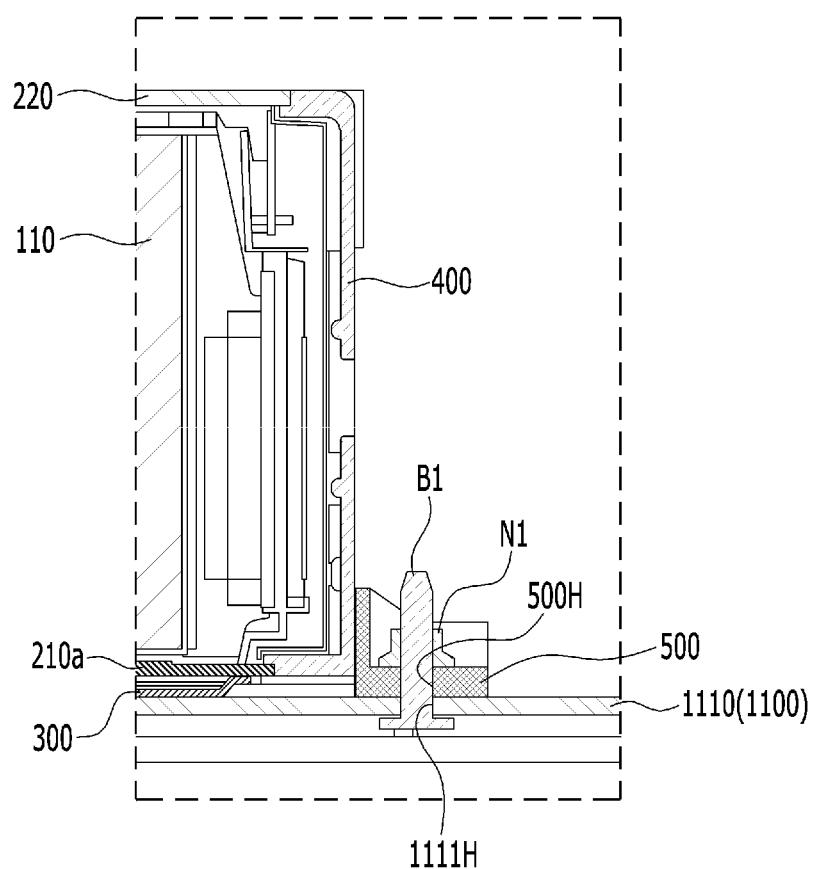
[Figure 11]

BATTERY PACK AND DEVICE INCLUDING THE SAME

CROSS-REFERENCE TO RELATED APPLICATION(S)

This application is a national phase entry under 35 U.S.C. § 371 of International Application No. PCT/KR2021/002919 filed on Mar. 9, 2021, which claims priority to, and the benefit of Korean Patent Application No. 10-2020-0052261 filed in the Korean Intellectual Property Office on Apr. 29, 2020, the entire contents of all of which are incorporated herein by reference.

Technical Field

The present invention relates to a battery pack and a device including the same, and more specifically, to a battery pack with improved cooling performance and safety and a device including the same.

Background Art

In modern society, as portable devices such as mobile phones, laptops, camcorders, and digital cameras are used in daily life, the development of technologies related to mobile devices as described above is becoming active. In addition, as a way to solve air pollution from conventional gasoline vehicles using fossil fuels, rechargeable batteries that can be charged and discharged are used as a power source for electric vehicles (EV), hybrid electric vehicles (HEV), plug-in hybrid electric vehicles (P-HEV), and the need for rechargeable battery development is increasing.

Currently, commercially available rechargeable batteries include a nickel cadmium battery, a nickel hydrogen battery, a nickel zinc battery, and a lithium rechargeable battery, and the lithium rechargeable battery is attracting attention for its merits that it has almost no memory effect compared to nickel-based rechargeable batteries, and thus it can be freely charged and discharged, has a very low self-discharge rate, and has high energy density.

These lithium rechargeable batteries mainly use lithium-based oxide and carbon materials as positive active materials and negative active materials, respectively. The lithium rechargeable battery includes an electrode assembly in which positive and negative plates respectively coated with a positive active material and a negative active material are disposed while disposing a separator therebetween, and a battery case that seals and accommodates the electrode assembly and an electrolyte solution.

In general, a lithium rechargeable battery can be classified into a can-type rechargeable battery in which the electrode assembly is built into a metal can and a pouch-type rechargeable battery in which the electrode assembly is built in a pouch of an aluminum laminate sheet according to the shape of the exterior material.

In the case of a rechargeable battery used in small devices, 2 to 3 battery cells are disposed, but in the case of a rechargeable battery used in a medium or large device such as an automobile, a battery module in which a plurality of battery cells are electrically connected is used. In such a battery module, a plurality of battery cells are serially or coupled in parallel to form a battery cell stack, and thus capacity and output are improved. In addition, at least one battery module may be mounted together with various control and protection systems such as a battery management system (BMS) and a cooling system to form a battery pack.

When a temperature of the rechargeable battery becomes higher than an appropriate temperature, the performance of the secondary battery may deteriorate, and in severe cases, there is also a risk of explosion or ignition. In particular, in a battery module or battery pack having a plurality of rechargeable batteries, that is, a battery cell, heat emitted from a plurality of battery cells is added up in a narrow space, and thus that the temperature may rise faster and more severely. In other words, in the case of a battery module in which a plurality of battery cells are stacked and a battery pack in which such a battery module is mounted, a high output can be obtained, but it is not easy to remove heat generated in the battery cells during charging and discharging. When the heat dissipation of the battery cell is not performed properly, degradation of the battery cell is accelerated and the lifespan is shortened, and the possibility of explosion or ignition increases.

Moreover, in the case of a battery module included in a vehicle battery pack, it is frequently exposed to direct sunlight and may be subjected to high temperature conditions such as summer or desert areas.

Therefore, when forming a battery module or battery pack, it is very important to secure stable and effective cooling performance.

FIG. 1 is a partial perspective view of a conventional battery pack, and FIG. 2 is a partial perspective view of a mounting method of a battery module included in the battery pack of FIG. 1.

Referring to FIG. 1 and FIG. 2, the conventional battery pack may include a plurality of battery modules 10 and a pack frame 11 where the plurality of battery modules are received. For convenience of explanation, FIG. 1 shows only one battery module.

In the conventional battery pack, a refrigerant pipe is provided for cooling the battery module 10, and the refrigerant is supplied through a refrigerant pipe connector 13 connected to the refrigerant pipe. Such a refrigerant is usually cooling water, and a fluid indirect cooling structure is applied to lower the temperature by flowing the cooling water inside the battery pack.

Meanwhile, when the battery module 10 is accommodated in the pack frame 11, mounting holes are provided at four corners, and a mounting bolt 12 can pass through the mounting hole to be fastened to the pack frame 11. Such a mounting combination can be provided for each battery module 10.

In this case, the cooling configuration such as the refrigerant pipe connector 13 for cooling the battery module 10 and the mounting configuration such as the mounting bolt 12 for mounting the battery module 10 are separate configurations, thereby causing a problem in that there are many and complicated parts for each configuration.

In addition, due to assembly defects or accidents during operation, refrigerant leakage may occur from the refrigerant pipe or the refrigerant pipe connector 13, and the like, and thus leaked refrigerant penetrates into the battery pack, thereby causing a fire or explosion.

Therefore, it is required to develop a battery pack that can minimize damage caused by the refrigerant leakage while improving cooling performance.

DISCLOSURE

Technical Problem

The present invention is to provide a battery pack that can block damage from a refrigerant leakage while improving cooling performance, and a device including the same.

However, the problems to be solved by the embodiments of the present invention are not limited to the above-described problems and can be variously expanded in the range of technical ideas included in the present invention.

Technical Solution

A battery pack according to an embodiment of the present invention includes: a plurality of battery modules including a battery cell stack where a plurality of battery cells are stacked, a module frame accommodating the battery cell stack, and a heat sink disposed below a bottom portion of the module frame; a pack frame that accommodates the plurality of battery modules; and a refrigerant transmission bolt that fastens the bottom portion of the module frame, the heat sink, and the pack frame. The pack frame includes a pack refrigerant pipe for supply and discharge of a refrigerant, and a connection pipe that connects the pack refrigerant pipe and the heat sink is formed in the refrigerant transmission bolt.

The module frame may include a module frame extension portion formed by an extended portion of the bottom portion of the module frame; the heat sink may include a heat sink extension portion extended to a portion where the module frame extension portion is located from one side of the heat sink; and the refrigerant transmission bolt may fasten the module frame extension portion, the heat sink extension portion, and the pack frame.

A refrigerant opening may be formed in the pack frame, a first mounting hole may be formed in the module frame extension portion, and a second mounting hole may be formed in the heat sink extension portion. The refrigerant transmission bolt may pass through the first mounting hole, the second mounting hole, and the refrigerant opening.

The refrigerant transmission bolt may include a main body portion where the connection pipe is formed, and a head portion located at an upper end of the main body portion.

The refrigerant transmission bolt may include a first opening and a second opening that are connected with the connection pipe and formed in the main body portion; the first opening may be disposed inside the pack refrigerant pipe; and the second opening may be disposed between the bottom portion of the module frame and the heat sink.

An opening direction of the first opening may be parallel with a penetration direction of the connection pipe; and an opening direction of the second opening may be perpendicular to the penetration direction of the connection pipe.

The second opening may be formed in plural along an external circumferential surface of the main body portion.

The battery pack may further include a gasket that surrounds the main body portion, and the gasket may be positioned at least between the head portion and the module frame extension portion formed by extending a portion of the bottom portion of the module frame and between the heat sink and the pack frame.

Protruding portions may be formed in a front and a rear of the battery module, respectively; and the battery pack may further include fixing brackets disposed at the front and the rear of the battery module respectively, and combined to the pack frame while surrounding the protruding portions.

The protruding portions may be formed at a lower corner of the front of the battery module and a lower corner of the rear of the battery module; and the fixing bracket may include a fixing portion that surrounds a top surface and one side surface of the protruding portion.

A bracket hole may be formed in the fixing bracket and a pack frame hole is formed in the pack frame, and the battery pack may further include a bracket bolt passing through the pack frame hole and the bracket hole, and a bracket nut combined with the bracket bolt.

The module frame may include a module frame extension portion formed by extending a portion of the bottom portion of the module frame, the heat sink may include a heat sink extension portion extending from one side of the heat sink to a portion where the module frame extension portion is positioned, the refrigerant transmission bolt may fasten the module frame extension portion, and the heat sink extension portion, and the pack frame. The fixing bracket may include a cover portion that covers the module frame extension portion.

The battery pack may further include an insulation member disposed between the protruding portion and the pack frame.

The pack frame may include a support frame that supports the battery module and a lower frame that is disposed below the support frame, and the pack refrigerant pipe may be disposed between the support frame and the lower frame.

Advantageous Effects

According to embodiments of the present invention, mounting fixing and pressure sealing can be simultaneously implemented such that the number of parts can be reduced, and the structure can be simplified through the refrigerant transmission bolt in which the refrigerant flow path is formed.

In addition, it is possible to minimize the influence on the alignment between through-holes required to supply the refrigerant, thereby reducing the possibility of refrigerant leakage.

In addition, through the improved fixing bracket structure, it is possible to simultaneously securely fix the battery module and effectively block damage caused by the refrigerant leakage.

Effects of the present invention are not limited to the effects mentioned above, and other effects not mentioned will be clearly understood by a person of an ordinary skill in the art from the disclosure of the scope of the claims.

DESCRIPTION OF THE DRAWINGS

FIG. 1 is a partial perspective view of a conventional battery pack.

FIG. 2 is a partial perspective view of a mounting method of a battery module of the battery pack of FIG. 1.

FIG. 3 is a perspective view of a battery module and a pack frame of a battery pack according to an embodiment of the present invention.

FIG. 4 is an exploded perspective view of a fixing bracket for the battery module of FIG. 3.

FIG. 5 is an exploded perspective view of the battery module of FIG. 3.

FIG. 6 is a partial perspective view of a portion "A" of FIG. 3.

FIG. 7 is a partial cross-sectional view of FIG. 6 taken along a line B-B'.

FIG. 8 is a partially enlarged perspective view of a portion "E" of FIG. 7.

FIG. 10 is a partial cross-sectional view of FIG. 6 taken along a line C-C'.

FIG. 11 is a partial cross-sectional view of FIG. 6 taken along a line D-D'.

MODE FOR INVENTION

Figure 9A:
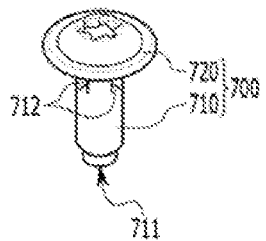
FIG. 9(*a*) is a front perspective view of a refrigerant transmission bolt according to embodiment of the present invention.
FIG. 9(b) is a bottom view of the refrigerant transmission bolt of FIG. 9(a).
FIG. 9(c) is a front view of the refrigerant transmission bolt of FIG. 9(a).

The present invention will be described more fully hereinafter with reference to the accompanying drawings, in which embodiments of the invention are shown. The present invention may be implemented in several different forms and is not limited to the embodiments described herein.

The drawings and description are to be regarded as illustrative in nature and not restrictive. Like reference numerals designate like elements throughout the specification.

In addition, since the size and thickness of each configuration shown in the drawings are arbitrarily indicated for better understanding and ease of description, the present invention is not necessarily limited to the drawings. In the drawings, the thickness of layers, films, panels, regions, etc., are exaggerated for clarity. In addition, in the drawings, the thickness of some layers and regions is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

FIG. 3 is a perspective view of a battery module and a pack frame included in a battery pack according to an embodiment of the present invention. FIG. 4 is an exploded perspective view of a fixing bracket that fixes a battery module to a pack frame. FIG. 5 is an exploded perspective view of the battery module of FIG. 3.

Referring to FIG. 3 to FIG. 5, a battery pack according to an embodiment of the present invention includes a plurality of battery modules 100, a pack frame 1100 receiving the plurality of battery modules 100, and a refrigerant transmission bolt. The battery module 100 includes a battery cell stack 120 in which the plurality of battery cells 110 are stacked, a module frame 200 accommodating the battery cell stack 120, and a heat sink 300 positioned below a bottom portion 210a of the module frame 200. The coolant/refrigerant transmission bolt will be described later.

The battery cell 110 may be a pouch-type battery cell. Such a pouch-type battery cell may be formed by receiving an electrode assembly in a laminate-sheet pouch case including a resin layer and a metal layer, and then thermally sealing an exterior circumference of the pouch case. In this case, the battery cell 110 may be formed in a rectangular sheet-like structure.

The battery cells 110 may be formed in plural, and a plurality of battery cells 110 are stacked to be electrically connected to each other to form a battery cell stack 120. In particular, as shown in FIG. 5, the plurality of battery cells 110 may be stacked along a direction that is parallel with the x-axis.

The battery cell stack 120 according to the present embodiment may be a large area module in which the number of battery cells 110 is greater than that of the prior art. Specifically, 32 to 48 battery cells 110 per battery module 100 may be included. In the case of such a large area module, a horizontal direction length of the battery module becomes longer. Here, the horizontal direction length may refer to a direction in which the battery cells 110 are stacked, that is, a length in a direction parallel to the x-axis.

The module frame 200 for accommodating the battery cell stack 120 may include an upper cover 220 and a U-shaped frame 210.

The U-shaped frame 210 may include a bottom portion 210a and two side portions 210b extending upward from both ends of the bottom portion 210a. The bottom portion 210a may cover the bottom surface (i.e., direction opposite to the z-axis) of the battery cell stack 120, and the side portions 210b may cover both lateral sides (the x-axis direction and the opposite direction thereof) of the battery cell stack 120.

An upper cover 220 may be formed in a plate-shaped structure surrounding the remaining upper surface (z-axis direction) except for the lower surface and both lateral sides covered by the U-shaped frame 210. The upper cover 220 and the U-shaped frame 210 are combined by welding or the like in a state in which corresponding corner portions are in contact with each other, thereby forming a structure that covers the battery cell stack 120 vertically and horizontally. It is possible to physically protect the battery cell stack 120 through the upper cover 220 and the U-shaped frame 210. To this end, the upper cover 220 and the U-shaped frame 210 may include a metal material having predetermined strength.

Meanwhile, although not specifically shown, the module frame 200 according to an exemplary variation may be a mono frame in the form of a metal plate in which an upper surface, a lower surface, and both lateral sides are integrated. That is, it is not a structure in which the U-shaped frame 210 and the upper cover 220 are coupled to each other, but is a structure manufactured by extrusion molding, and thus the upper surface, the lower surface, and both lateral sides are integrated.

An end plate 400 may be positioned to cover the battery cell stack 120 by being positioned on the front and rear surfaces of the battery cell stack 120 (y-axis direction and its opposite direction). Such an end plate 400 may physically protect the battery cell stack 120 and other electronic devices from external impact.

Meanwhile, although it is not specifically illustrated, and a bus bar frame where a bus bar is mounted and an insulation cover for electrical insulation may be disposed between the battery cell stack 120 and the end plate 400.

Meanwhile, the battery module 100 according to the present embodiment includes a heat sink 300 disposed below the bottom portion 210a of the module frame 200. The bottom portion 210a of the module frame 200 may form an upper plate of the heat sink 300, and a recessed portion 340 of the heat sink 300 and the bottom portion 210a of the module frame 200 may form a coolant/refrigerant flow path.

Specifically, the heat sink 300 may include a lower plate 310 that forms a skeleton of the heat sink 300 and is directly bonded with the bottom portion 210*a* of the module frame 200 by welding and the like, and the recessed portion 340, which is a path through which coolant/refrigerant flows.

The recessed portion 340 of the heat sink 300 corresponds to a portion in which the lower plate 310 is recessed downward. The recessed portion 340 may be a tube having a U-shaped cross-section cut vertically in the x-z plane based on a direction in which the coolant/refrigerant flow path extends, and the bottom portion 210*a* may be positioned on an open upper side of the U-shaped tube. As the heat sink 300 contacts the bottom portion 210*a*, a space between the recessed portion 340 and the bottom portion 210*a* becomes a region through which coolant/refrigerant flows, that is, a flow path for the refrigerant. Accordingly, the bottom portion 210*a* of the module frame 200 may contact the refrigerant.

Although there is no particular limitation on a manufacturing method of the recessed portion 340 of the heat sink 300, the U-shaped recessed portion 340 with an open upper side may be formed by providing a structure in which a depression is formed with respect to the plate-shaped heat sink 300.

Meanwhile, although not shown, a thermal conductive resin layer including a thermal conductive resin may be positioned between the bottom portion 210*a* of the module frame 200 and the battery cell stack 120 of FIG. 5. The thermal conductive resin layer may be formed by applying a thermal resin to the bottom portion 210*a*, and curing the applied thermal conductive resin.

The thermal conductive resin may include a thermally conductive adhesive material, and specifically may include at least one of a silicon material, a urethane material, and an acryl material. The thermal conductive resin is in a liquid state during application, and it is hardened after application and thus may serve to fix at least one battery cell 110 constituting the battery cell stack 120. In addition, the thermal conductive resin has excellent thermal conductivity characteristics, and thus heat generated by the battery cell 110 can be quickly transferred to the lower side of the battery module.

The battery module 100 according to the present embodiment can further improve cooling performance by implementing the integrated cooling structure of the module frame 200 and the heat sink 300. As the bottom portion 210*a* of the module frame 200 serves to correspond the upper plate of the heat sink 300 such that the integrated cooling structure can be implemented. The cooling efficiency is increased due to direct cooling, and a space utilization rate on the battery module 100 and the battery pack in which the battery module 100 is mounted can be further improved through the structure in which the heat sink 300 is integrated with the bottom portion 210*a* of the module frame 200.

Specifically, the heat generated by the battery cell 110 is transferred to the outside of the battery module 100 through the thermal conductive resin layer (not shown) positioned between the battery cell stack 120 and the bottom portion 210*a*, the bottom portion 210*a* of the module frame 200, and the refrigerant. Since a conventional unnecessary cooling structure is removed, the heat transfer path is simplified and an air gap between each layer can be reduced, and accordingly, cooling efficiency or performance can be increased. In particular, since the bottom portion 210*a* is formed of the upper plate of the heat sink 300 and thus the bottom portion 210*a* directly contacts the refrigerant, there is a merit of more direct cooling through the refrigerant.

In addition, the height of the battery module 100 is reduced through the removal of unnecessary cooling structures and thus it possible to reduce costs and increase spatial utility. Furthermore, since the battery module 100 can be compactly disposed, the capacity or output of a battery pack including a plurality of battery modules 100 can be increased.

Meanwhile, the bottom portion 210*a* of the module frame 200 may be bonded through welding to the lower plate 310 portion of the heat sink 300 in which the recessed portion 340 is not formed. In the present embodiment, through the integrated cooling structure of the bottom portion 210*a* of the module frame 200 and the heat sink 300, not only can the above-described cooling performance be improved, but also the load of the battery cell stack 120 accommodated in the module frame 200 can be increased and the rigidity of the battery module 100 can be reinforced. Furthermore, since the lower plate 310 and the bottom portion 210*a* of the module frame 200 are sealed through welding and the like, the refrigerant can flow through the recessed portion 340 formed inside the lower plate 310 without leakage.

For effective cooling, as shown in FIG. 5, it is preferable that the recessed portion 340 is formed over the entire region corresponding to the bottom portion 210*a* of the module frame 200. To this end, the recessed portion 340 may be bent at least once and thus may be connected from one side to the other. In particular, the recessed portion 340 is preferably bent several times in order to form the recessed portion 340 over the entire region corresponding to the bottom portion 210*a* of the module frame 200. As the refrigerant moves from the start point to the end point of the refrigerant flow path formed over the entire region corresponding to the bottom portion 210*a* of the module frame 200, efficient cooling of the entire region of the battery cell stack 120 can be achieved.

The refrigerant is a medium for cooling, and there is no particular limitation thereof, but it may be cooling water.

Protrusion patterns 340D may be formed in the recessed portion 340 of the heat sink 300 according to the present embodiment. In the case of a large-area battery module in which the number of stacked battery cells is much increased compared to the prior art, such as the battery cell stack 120 according to the present embodiment, the refrigerant flow path may be formed to be wider, and thus the temperature deviation may be more severe. In a large-area battery module, a case in which approximately 32 to 48 battery cells are stacked in one battery module may be included in comparison to a case in which approximately 12 to 24 battery cells are stacked in one battery module. In such a case, the protrusion patterns 340D according to the present embodiment has an effect of substantially reducing a width of a cooling path, thereby minimizing a pressure drop and simultaneously reducing the temperature deviation between the refrigerant passage width. Therefore, it is possible to implement a uniform cooling effect.

Hereinafter, referring to FIG. 6 and FIG. 7, fastening through the refrigerant transmission bolt will be explained in detail.

FIG. 6 is a partial perspective view of the portion "A" in FIG. 3. FIG. 7 is a partial cross-sectional view of FIG. 6, taken along the line B-B'.

Referring to FIG. 4 to FIG. 7, the battery pack according to the present embodiment includes a refrigerant transmission bolt 700 that fastens the bottom portion 210*a* of the module frame 200, the heat sink 300, and the pack frame 1100.

The pack frame 1100 according to the present embodiment may include pack refrigerant pipes 1130 and 1140 for supply and discharge of the refrigerant, and refrigerant openings 1150 and 1160 formed in the pack refrigerant pipes 1130 and 1140. Specifically, the pack refrigerant pipes 1130 and 1140 may include a pack refrigerant supply pipe 1130 for refrigerant supply and a pack refrigerant discharge pipe 1140 for refrigerant discharge. In addition, the refrigerant openings 1150 and 1160 may include a refrigerant supply opening 1150 connected to the pack refrigerant supply pipe 1130 and a refrigerant discharge opening 1160 connected to the pack refrigerant discharge pipe 1140.

The pack frame 1100 may include a support frame 1110 supporting the battery module 100 and a lower frame 1120 positioned below the support frame 1110. The pack refrigerant supply pipe 1130 and the pack refrigerant discharge pipe 1140 may be positioned between the support frame 1110 and the lower frame 1120, and, more specifically, the pack refrigerant supply pipe 1130 and the pack refrigerant discharge pipe 1140 may be positioned just below the support frame 1110 such that it may be integrated with the support frame 1110.

The module frame 200 according to the present embodiment may include a module frame extension portion 211 formed by extending a part of the bottom portion 210a of the module frame 200. In addition, the heat sink 300 according to the present embodiment may include a heat sink extension portion 311 extending from one side of the heat sink 300 to a portion where the module frame extension portion 211 is positioned. The module frame extension portion 211 and the heat sink extension portion 311 may have shapes corresponding to each other, and may be formed to extend to pass the end plate 400.

A first mounting hole 211H may be formed in the module frame extension portion 211 and a second mounting hole 311H may be formed in the heat sink extension portion 311.

The refrigerant transmission bolt 700 according to the present embodiment fastens the module frame extension portion 211, the heat sink extension portion 311, and the pack frame 1100, and, specifically, the refrigerant transmission bolt 700 is fastened by passing sequentially through the first mounting hole 211H, the second mounting hole 311H, and the supply opening 1150 of the pack frame 1100.

Hereinafter, referring to FIG. 8 and FIG. 9, a refrigerant transmission structure through the refrigerant transmission bolt will be described in detail. Among the pack refrigerant pipes 1130 and 1140, the pack refrigerant supply pipe 1130 will be mainly described, but the refrigerant transmission structure through the refrigerant transmission bolt 700 may be applied to the pack refrigerant discharge pipe 1140 as well.

Figure 9B:
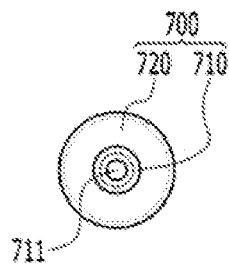
Figure 9C:
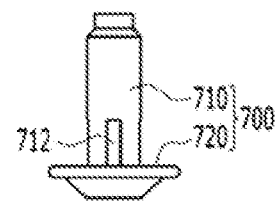

FIG. 8 is a partially enlarged perspective view of the portion "E" in FIG. 7, and FIG. 9(a) to FIG. 9(c) are figures of the refrigerant transmission bolt viewed from various angles according to embodiment of the present invention. Specifically, FIG. 9(a) is a perspective view of the refrigerant transmission bolt 700, FIG. 9(b) is a top plan view of the refrigerant transmission bolt 700 of the FIG. 9(a) viewed from the bottom, and FIG. 9(c) is a side view of the refrigerant transmission bolt 700 of FIG. 9(a) viewed from the side after it turning over.

Referring to FIG. 8 and FIG. 9, a connection pipe 713 connecting the pack refrigerant pipes 1130 and 1140 and the heat sink 300 is formed in the refrigerant transmission bolt 700 according to the present embodiment. In FIG. 8, the connection pipe 713 of the refrigerant transmission bolt 700, connecting the pack refrigerant supply pipe 1130 and the heat sink 300, is illustrated.

Specifically, the refrigerant transmission bolt 700 may include a main body portion where the connection pipe 713 is formed, and a head portion 720 positioned at an upper end of the main body portion 710. The main body portion 710 has a columnar shape having a diameter corresponding to the interior diameter of the first mounting hole 211H and the second mounting hole 311H, but although not specifically shown in the drawing, a thread may be formed on an external circumferential surface. A thread may also be formed on the inner surface of the refrigerant supply opening 1150, and thus the main body portion 710 may be fastened to the pack frame 1100. The head portion 720 is formed to have a larger diameter than the main body portion 710, and may bring the module frame extension portion 211 and the heat sink extension portion 311 into close contact with each other.

The refrigerant transmission bolt 700 may include a first opening 711 and a second opening 712 connected to the connection pipe 713 and formed in the main body portion 710. The first opening 711 may be disposed inside the pack refrigerant supply pipe 1130, and the second opening 712 may be disposed between the bottom portion 210a of the module frame 200 and the heat sink 300. An opening direction of the first opening 711 may be parallel to a penetration direction of the connection pipe 713, and an opening direction of the second opening 712 may be perpendicular to a penetration direction of the connection pipe 713. The first opening 711 may be positioned at one end of the main body portion 710 while being connected to the connection pipe 713, and the second opening 712 may be formed in plural along the external circumferential surface of the main body portion 710 to be connected to the connection pipe 713.

The refrigerant that has moved through the pack refrigerant supply pipe 1130 may sequentially pass through the first opening 711, the connection pipe 713, and the second opening 712 to inflow between the bottom portion 210a and the heat sink 300. As described above, the inflowed refrigerant may move along the recessed portion 340 of the heat sink 300 to cool the battery module 100.

The refrigerant transmission bolt 700 according to the present embodiment may serve to mount and fix the module frame 200 and the heat sink 300 to the pack frame 1100, as well as serve as a path for supplying the refrigerant to the bottom of the battery module 100. In addition, since the bottom portion 210a, the heat sink 300, and the pack refrigerant supply pipe 1130 are strongly adhered to each other by the fastening force of the refrigerant transmission bolt 700, the sealing property is improved, and thus the possibility of refrigerant leakage therebetween can be reduced. In other words, it is possible to simultaneously perform mounting fixation, pressurization sealing, and refrigerant transmission, and thus the number of parts can be reduced, and the structure can be simplified. In addition, since the refrigerant supply opening 1150 and the second mounting hole 311H are inevitably aligned by the refrigerant transmission bolt 700, the effect on the alignment between through-holes required to supply the refrigerant can be minimized, thereby reducing the possibility of refrigerant leakage.

Meanwhile, the battery pack according to the present embodiment may further include a gasket 600 surrounding the main body portion 710 of the refrigerant transmission bolt 700. The gasket 600 may be positioned in at least one of between the head portion 720 and the module frame extension portion 211 and between the heat sink 300 and the pack frame 1100. Through such a gasket 600, leakage of refrigerant can be prevented.

Although not specifically shown, the first mounting hole 211H, the second mounting hole 311H, and the refrigerant discharge opening 1160 of the pack frame 1100 may also be fastened by the refrigerant transmission bolt 700 according to the present embodiment. In other words, according to the present embodiment, both pack refrigerant pipes 1130 and 1140 can be connected with the heat sink 300 through the refrigerant transmission bolt 700, and the first mounting hole 211H, the second mounting hole 311H, and the refrigerant transmission bolt 700 may be provided in plural. After the refrigerant inflowed through one of the second mounting holes 311H and the refrigerant transmission bolt 700 moves along the recessed portion 340, it may be discharged to the pack refrigerant discharge pipe 1140 through the other second mounting hole 311H and the refrigerant transmission bolt 700.

Hereinafter, referring to FIG. 10 and FIG. 11, a fixing manner through a fixing bracket will be described in detail.

FIG. 10 is a partial cross-sectional view of FIG. 6, taken along the line C-C', and FIG. 11 is a partial cross-sectional view of FIG. 6, taken along the line D-D'.

Referring to FIG. 4, FIG. 5, FIG. 10, and FIG. 11, a protruding portion 410 is formed on the front and rear surfaces of the battery module 100, respectively, according to the present embodiment. Front and rear end plates 400 of the battery module 100 may be positioned, and the protruding portion 410 may be formed on the end plate 400. Specifically, the protruding portion 410 may have a structure protruded toward a direction ((a direction parallel to the y-axis) that is perpendicular to a stacking direction of the battery cell 110. That is, the protruding portion 410 formed on the front surface of the battery module 100 may be protruded in the y-axis direction, and the protruding portion 410 formed on the rear surface of the battery module 100 may be protruded in the opposite direction of the y-axis.

In addition, the protruding portion 410 may be formed on a lower corner of the front surface of the battery module 100 and a lower corner of the rear surface of the battery module 100, respectively, and two protruding portions 410 spaced apart from each other on the front and rear surfaces of the battery module 100 may be formed.

The fixing bracket 500 may be coupled to the pack frame 1100 while surrounding the protruding portion 410. Specifically, the protruding portion 410 has an upper surface and three surfaces as it is protruded from the end plate 400, and the fixing bracket 500 may include a fixing portion 510 surrounding the upper surface and one side of the protruding portion 410. Furthermore, the fixing portion 510 may further surround the other two sides of the protruding portion 410.

Meanwhile, a bracket hole 500H is formed in the fixing bracket 500, and a pack frame hole 1111H is formed in the pack frame 1100. The battery pack according to the present embodiment may include a bracket bolt B1 passing through the pack frame hole 1111H and a bracket hole 500H and a bracket nut N1 coupled with the bracket bolt B1.

Specifically, the bracket hole 500H and the pack frame hole 1111H are positioned so as to correspond to each other, and the bracket bolt B1 can be erected upward through the pack frame hole 1111H and the bracket hole 500H. After that, the bracket bolt B1 is combined with the bracket nut N1 such that the fixing bracket 500 can be fixed to the pack frame 1100. For effective fixing, it is preferable that the pack frame hole 1111H, the bracket hole 500H, the bracket bolt B1, and the bracket nut N1 are each formed in plural, and as an embodiment, four of the pack frame hole 1111H, the bracket hole 500H, the bracket bolt B1, and the bracket nut N1 are formed, as shown in FIG. 4.

The two fixing brackets 500, which are disposed to face each other with the battery module 100 in between, surround the protruding portion 410 of the battery module 100 and are coupled to the pack frame 1100 through the bracket bolt B1 and the bracket nut N1, and thus the battery module 100 may be stored and fixed to the pack frame 1100.

Meanwhile, as shown in FIG. 10, the battery pack according to the present embodiment may further include an insulation member 800 that is disposed between the protruding portion 410 and the pack frame 1100. The insulation member 800 may be a pad-type member that exhibits electrical insulation. Galvanic corrosion may occur between end plate 400 and pack frame 1100 due to dissimilar material contact, and the occurrence of galvanic corrosion can be prevented by disposing the insulation member 800 therebetween.

Meanwhile, referring back to FIG. 6, the fixing bracket 500 according to the present embodiment may include a cover portion 520 that covers the module frame extension portion 211. In addition, the fastening structure of the bracket bolt B1 and the bracket nut N1 may be positioned on the left and right sides of the cover portion 520, respectively. The module frame extension portion 211 can be pressed by forming the cover portion 520 on the fixing bracket 500 fixed with the bracket bolt B1 and the bracket nut N1. Accordingly, the module frame extension portion 211 and the heat sink extension portion 311 are closely adhered to each other to reduce the possibility of refrigerant leakage therebetween. In addition, the head portion 720 of the refrigerant transmission bolt 700 may be closed and sealed while being surrounded by the end plate 400, the module frame extension portion 211, and the cover portion 520. It is possible to prevent leaked refrigerant from penetrating into the surrounding components by closing and sealing through the cover portion 520. That is, the cover portion 520 itself may perform a function of preventing the refrigerant leakage.

In the present embodiment, terms indicating directions such as before, after, left, right, up, and down are used, but these terms are only for convenience of explanation, and may vary depending on the position of the object or the position of the observer.

One or more battery modules according to the present embodiment described above may be mounted together with various control and protection systems such as a battery management system (BMS) and a cooling system to form a battery pack.

The battery module or battery pack can be applied to various devices. Specifically, it can be applied to transportation means such as electric bicycles, electric vehicles, hybrids, and the like, but is not limited thereto, and can be applied to various devices that can use secondary batteries.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: battery module
200: module frame
211: module frame extension portion

300: heat sink
311: heat sink extension portion
410: protruding portion
500: fixing bracket
700: refrigerant transmission bolt
713: connection pipe
1100: pack frame

The invention claimed is:

1. A battery pack comprising:
a plurality of battery modules, the battery modules including a battery cell stack with a plurality of stacked battery cells, a module frame accommodating the battery cell stack,
a heat sink disposed below a bottom portion of the module frame;
a pack frame to secure the plurality of battery modules thereto; and
a refrigerant transmission bolt coupling the module frame, the heat sink, and the pack frame,
wherein the pack frame comprises a pack refrigerant conduit for supply and discharge of a refrigerant, and
a connection conduit disposed in the refrigerant transmission bolt to connects the pack refrigerant conduit and the heat sink.

2. The battery pack of claim 1, wherein
the module frame comprises a module frame extension portion extending from the bottom portion,
the heat sink including a heat sink extension portion extending along the module frame extension portion,
the refrigerant transmission bolt coupling the module frame extension portion, the heat sink extension portion, and the pack frame.

3. The battery pack of claim 2, wherein
the pack frame includes a refrigerant opening,
the module frame extension portion including a first mounting hole,
the heat sink extension portion including a second mounting hole,
the refrigerant transmission bolt extending through the first mounting hole, the second mounting hole, and the refrigerant opening.

4. The battery pack of claim 1, wherein
the refrigerant transmission bolt comprises a main body portion and a head portion located at one end of the main body portion, the connection conduit being disposed in the main body portion.

5. The battery pack of claim 4, wherein
the connection conduit extends from a first opening of the main body portion to a second opening of the main body portion,
the first opening being disposed in the pack refrigerant conduit,
the second opening being disposed between the bottom portion of the module frame and the heat sink.

6. The battery pack of claim 5, wherein
an opening direction of the first opening is parallel with a penetration direction of the connection pipe; and an opening direction of the second opening is perpendicular to the penetration direction of the connection pipe.

7. The battery pack of claim 5, wherein the refrigerant transmission bolt includes a plurality of
the second openings along an external circumferential surface of the main body portion.

8. The battery pack of claim 4, further comprising a gasket surrounding the main body portion, a first portion of
the gasket being positioned between the head portion and a module frame extension portion extending from the bottom portion, a second portion of the gasket being positioned between the heat sink and the pack frame.

9. The battery pack of claim 1, further including
protruding portions in a front and a rear of the battery module,
the battery pack further including fixing brackets disposed at the front and the rear of the battery module, the fixing brackets configured to surround the protruding portions.

10. The battery pack of claim 9, wherein
the protruding portions are located at a lower corner of the front of the battery module and a lower corner of the rear of the battery module,
the fixing brackets including fixing portions that surround a top surface and a side surface of the protruding portions.

11. The battery pack of claim 9, wherein
a bracket hole extends through the fixing bracket, a pack frame hole extending through the pack frame,
the battery pack further comprises a bracket bolt passing through the pack frame hole and the bracket hole, and a bracket nut couplable with the bracket bolt.

12. The battery pack of claim 9, wherein
the module frame comprises a module frame extension portion extending from the bottom portion,
the heat sink including a heat sink extension portion extending along the module frame extension portion,
the refrigerant transmission bolt coupling the module frame extension portion, the heat sink extension portion, and the pack frame,
the fixing bracket including a cover portion covering the module frame extension portion.

13. The battery pack of claim 9, further comprising an insulation member disposed between the protruding portions and the pack frame.

14. The battery pack of claim 1, wherein
the pack frame comprises a support frame supporting the battery module and a lower frame disposed below the support frame,
the pack refrigerant conduit being disposed between the support frame and the lower frame.

15. A device comprising the battery pack of claim 1.

* * * * *